(12) United States Patent
Barker et al.

(10) Patent No.: US 10,439,400 B2
(45) Date of Patent: Oct. 8, 2019

(54) ELECTRIC PROTECTION ON AC SIDE OF HVDC

(71) Applicant: General Electric Technology GmbH, Baden (CH)

(72) Inventors: Carl David Barker, Staffordshire (GB); Andre Paulo Canelhas, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 55 days.

(21) Appl. No.: 14/913,151

(22) PCT Filed: Aug. 19, 2014

(86) PCT No.: PCT/EP2014/067690
§ 371 (c)(1),
(2) Date: Feb. 19, 2016

(87) PCT Pub. No.: WO2015/024950
PCT Pub. Date: Feb. 26, 2015

(65) Prior Publication Data
US 2016/0211669 A1 Jul. 21, 2016

(30) Foreign Application Priority Data
Aug. 21, 2013 (EP) .................................... 13275191

(51) Int. Cl.
*H02J 3/36* (2006.01)
*H02M 1/32* (2007.01)
(Continued)

(52) U.S. Cl.
CPC ............. *H02J 3/36* (2013.01); *H02H 7/1252* (2013.01); *H02H 7/1257* (2013.01); *H02M 1/32* (2013.01);
(Continued)

(58) Field of Classification Search
CPC ......... H02M 2001/322; H02M 7/7575; H02M 7/02; H02M 7/66; H02M 7/72;
(Continued)

(56) References Cited

U.S. PATENT DOCUMENTS 8,643,995 B2 * 2/2014 Nunes ...................... H02M 1/32
361/111
9,046,560 B2 * 6/2015 Li .......................... G01R 31/025
(Continued)

FOREIGN PATENT DOCUMENTS

CN 2884641 3/2007
EP 0 497 752 A1 8/1992
(Continued)

OTHER PUBLICATIONS

International Search Report and Written Opinion, PCT Application No. PCT/EP2014/067690, 12 pages (dated Nov. 18, 2014).
Marquardt, Rainer, "Modular Multilevel Converter Topologies with DC-Short Circuit Current Limitation," 8th International Conference on Power Electronics, ECCE Asia, The Shilla Jeju, Korea, 7 pages (May 30-Jun. 3, 2011).
English-language machine translation of CN 2884641, Zhang Shuren (Mar. 28, 2007).
(Continued)

*Primary Examiner* — Yusef A Ahmed
*Assistant Examiner* — Shahzeb K Ahmad
(74) *Attorney, Agent, or Firm* — Eversheds-Sutherland (US) LLP

(57) ABSTRACT

An electrical assembly comprises a power converter including first and second DC terminals and an AC terminal. The electrical assembly also includes a grounding circuit to connect the AC terminal to ground. The grounding circuit defines first and second current flow paths between the AC terminal and ground. The first current flow path includes a switching element. The second current flow path includes a
(Continued)

first current flow control element that is configured to operate in a first mode in which it reduce the flow of current between the AC terminal and ground when the first current flow path is open. The electrical assembly additionally includes a control unit configured to operate the switching element to maintain open the first current flow path following an occurrence of a DC network fault. The power converter is configured to continue transferring power between the DC and AC networks throughout the DC network fault.

11 Claims, 3 Drawing Sheets

(51) Int. Cl.
  *H02H 7/125* (2006.01)
  *H02M 5/458* (2006.01)
  *H02H 7/12* (2006.01)
  *H02M 7/483* (2007.01)
(52) U.S. Cl.
  CPC .......... *H02M 5/458* (2013.01); *H02H 7/1213* (2013.01); *H02M 2001/325* (2013.01); *H02M 2007/4835* (2013.01); *Y02E 60/60* (2013.01)
(58) Field of Classification Search
  CPC .......... H02M 7/75; H02M 7/757; H02M 5/40; H02M 5/45; H02M 5/4505; H02M 5/453; H02M 5/4585; H02M 1/32; H02H 9/04; H02H 9/08; H02J 3/36; Y02E 60/60
  See application file for complete search history.

(56) References Cited

U.S. PATENT DOCUMENTS

| | | | |
|---|---|---|---|
| 2012/0120691 A1 | 5/2012 | Armschat et al. | |
| 2012/0140363 A1* | 6/2012 | Jeppe | H02H 7/1222 |
| | | | 361/18 |
| 2013/0070491 A1* | 3/2013 | Jiang-Hafner | H02J 3/36 |
| | | | 363/41 |
| 2015/0130379 A1* | 5/2015 | Ando | G01R 31/025 |
| | | | 318/400.21 |

FOREIGN PATENT DOCUMENTS

| | | |
|---|---|---|
| EP | 2 894 752 A1 | 7/2015 |
| WO | WO 1984/02807 A1 | 7/1984 |
| WO | WO 2010/149217 A1 | 12/2010 |
| WO | WO 2011/150962 A1 | 12/2011 |
| WO | WO 2011/150963 A1 | 12/2011 |
| WO | WO-2012/055447 A1 | 5/2012 |
| WO | WO 2013/060368 A1 | 5/2013 |
| WO | WO-2015/104398 A1 | 7/2015 |

* cited by examiner

ELECTRIC PROTECTION ON AC SIDE OF HVDC

CROSS-REFERENCE TO RELATED APPLICATIONS

The present application is a National Stage of International Application No. PCT/EP2014/067690, filed Aug. 19, 2014, which claims the benefit of and priority to European Application No. 13275191, filed Aug. 21, 2013, which is incorporated herein by reference in its entirety.

This invention relates to an electrical assembly for use in a high voltage power transmission network, and to a power transmission network including such an electrical assembly.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect AC electrical networks operating at different frequencies. In any such network, converters are required at each interface between AC and DC power to effect the required conversion, and one such form of converter is a power converter.

According to a first aspect of the invention there is provided an electrical assembly comprising:

a power converter including first and second DC terminals connectable to a DC network and an AC terminal connectable to an AC network;

a grounding circuit to connect the AC terminal to ground, the grounding circuit defining first and second current flow paths between the AC terminal and ground, the first current flow path including a switching element operable to selectively open and close the first current flow path, and the second current flow path including a first current flow control element configured to operate in a first mode in which it minimises the flow of current through the second current flow path when the first current flow path is open and thereby minimises the flow of current between the AC terminal and ground when the first current flow path is open; and a control unit operatively connected to the switching element, the control unit being configured to operate the switching element to maintain open the first current flow path following an occurrence of a DC network fault, wherein the power converter is configured to continue transferring power between the DC and AC networks throughout the DC network fault.

Minimising the flow of current through the second current flow path, i.e. reducing the flow of current through the second current flow path to a negligible amount as close as possible to zero, allows the power converter to continue transferring power between the AC and DC networks throughout the DC network fault (e.g. throughout a DC pole to ground fault), and hence allows for power transfer to continue in any associated power transmission network so as to minimise disruption to the network.

Minimising the flow of current through the second current flow path also minimises the amount of any DC fault current flowing through the DC network in the event of a DC network fault, and thereby permits the opening of, e.g. a DC circuit breaker, a DC load break switch, or an AC circuit breaker, if it is desired to disconnect the DC network from the power converter.

Meanwhile, the inclusion of a switching element to selectively open and close the first current flow path allows the first current flow path to selectively bypass the first current flow control element and to provide a less inhibited current flow path instead. Such a less inhibited current flow path thereafter permits the discharge of any DC voltage at the AC terminal which can be useful in removing a voltage imbalance between the first and second DC terminals of the power converter, or in protecting an AC side of the power converter from a transient overvoltage.

Optionally the first current flow control element is further configured to selectively operate in a second mode in which it allows the flow of current through the second current flow path when the voltage across the first current flow control element exceeds a predetermined threshold.

The inclusion of such a first current flow control element prevents the voltage at the AC terminal exceeding a desired limit, e.g. a safe limit at which the insulation of an associated starpoint terminal is rated to provided protection, and so automatically protects the AC side of the power converter from a transient overvoltage.

Preferably the first current flow control element is or includes a non-linear resistor.

Such a non-linear resistor has desirable non-linear current-voltage characteristics such that it normally presents a high impedance and so effectively inhibits the flow of current therethrough, while also conducting significantly increased current when exposed to an excessive voltage.

The first current flow path may additionally include a second current flow control element configured to reduce the flow of current therethrough to a lesser extent than the first current flow control element when configured to operate in its first mode.

The inclusion of such a second current flow control element in the first current flow path controls the rate at which any DC voltage at the AC terminal is discharged via the first current flow path so as to, e.g. control the rate at which any voltage imbalance between the first and second DC terminals is removed.

In a preferred embodiment of the invention the second current flow control element is or includes a linear resistor.

A linear resistor, i.e. a resistor which has a normal current-voltage characteristic, readily provides for a desired reduced flow rate of current therethrough.

In an electrical assembly according to another preferred embodiment of the invention, the control unit may be operatively connected with the first and second DC terminals to monitor the occurrence of a DC network fault associated with one or both of the DC terminals, the control unit additionally being configured to operate the switching element to close the first current flow path at a predetermined point.

Preferably the predetermined point at which the control unit is configured to operate the switching element to close the first current flow path is a set period of time after occurrence of a DC network fault.

The predetermined point at which the control unit is configured to operate the switching element to close the first current flow path may be when the energy dissipated by the first current flow control element reaches a threshold value.

The inclusion of such a control unit allows the electrical assembly to ride-through a short-duration DC network fault and thereafter correct any imbalance between the voltages at the first and second DC terminals or, in the event of a longer-duration fault and the failure of any other fault clearing apparatus, to provide back-up protection of the AC side of the power converter and DC network by discharging any remaining DC voltage at the AC terminal.

According to a second aspect of the invention there is provided a power transmission network comprising an electrical assembly as described hereinabove, the power converter of the electrical assembly being connected to a further power converter via first and second DC transmission mediums.

The power transmission network of the invention shares the advantages associated with the electrical assembly thereof.

Optionally each of the power converter and the further power converter is a three-phase power converter.

There now follows a brief description of preferred embodiments of the invention, by way of non-limiting example, with reference being made to the following figures in which.

Figure 1:
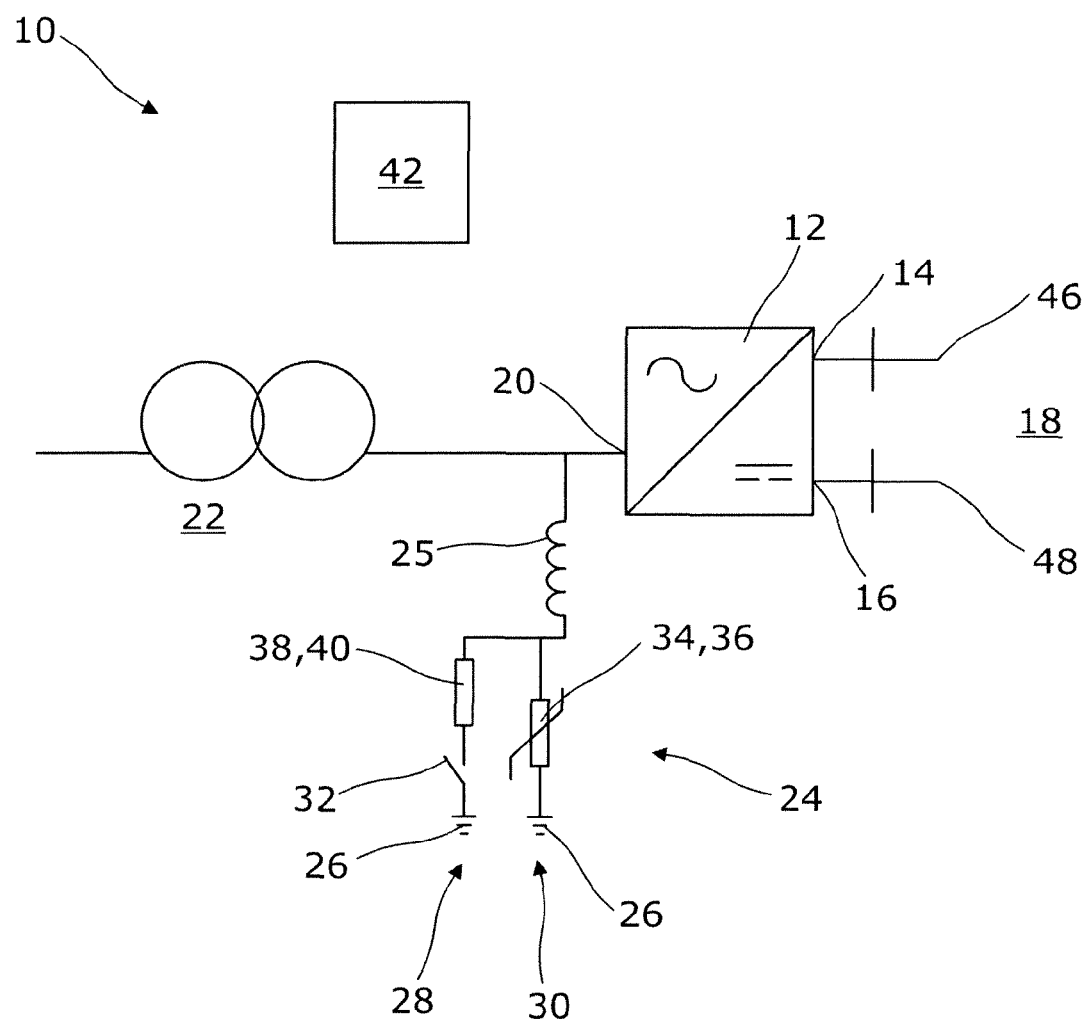
FIG. 1 shows a schematic view of an electrical assembly according to a first embodiment of the invention.
Figure 2A:
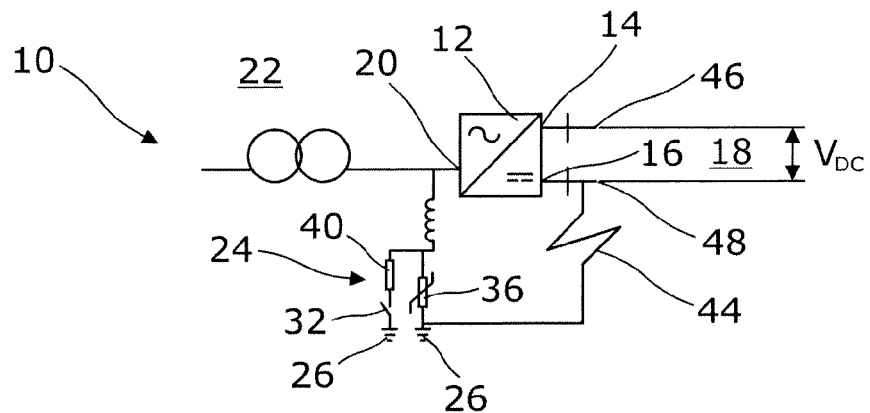
FIG. 2(a) illustrates schematically operation of the electrical assembly shown in FIG. 1 in a first mode following the occurrence of a DC network fault.
Figure 2B:
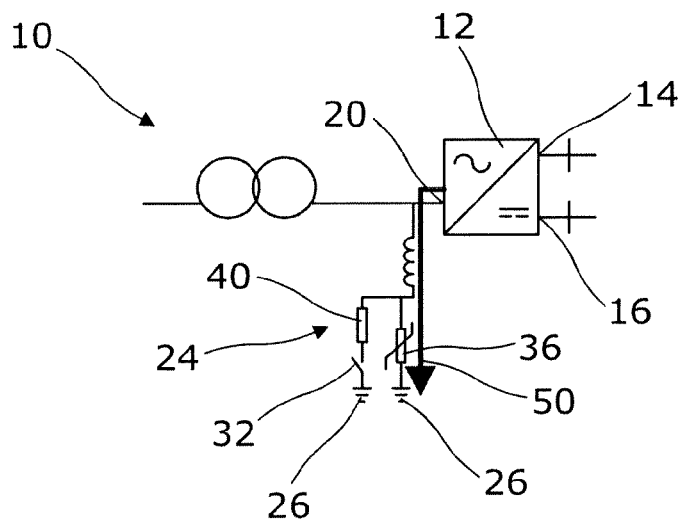
FIG. 2(b) illustrates schematically operation of the electrical assembly shown in FIG. 1 in a second mode following the occurrence of a DC network fault.
Figure 2C:
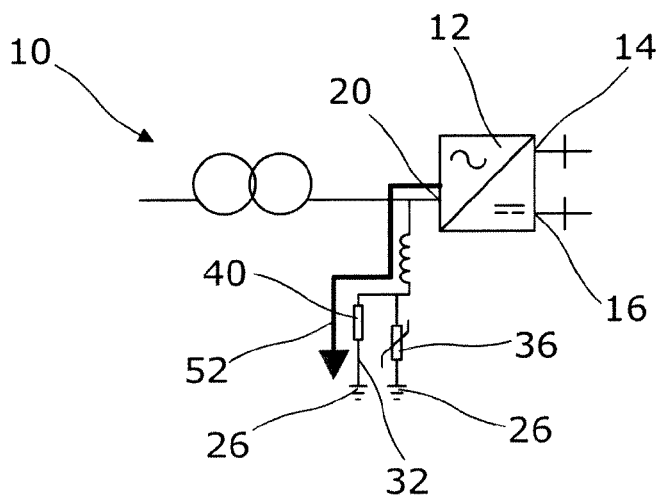
Figure 3:
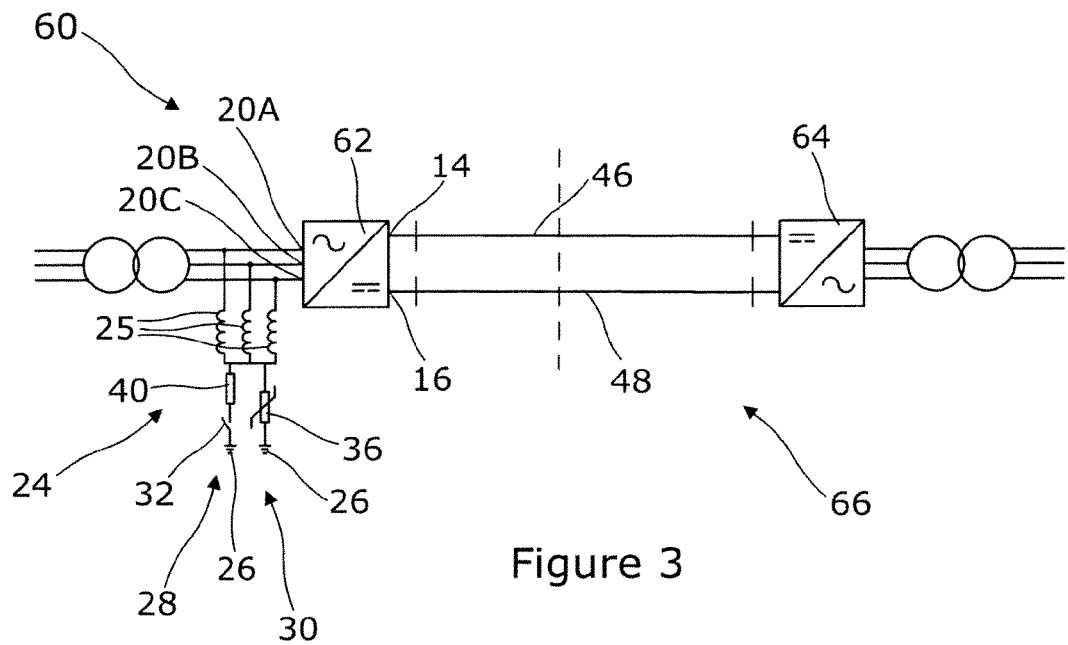
Figure 4:
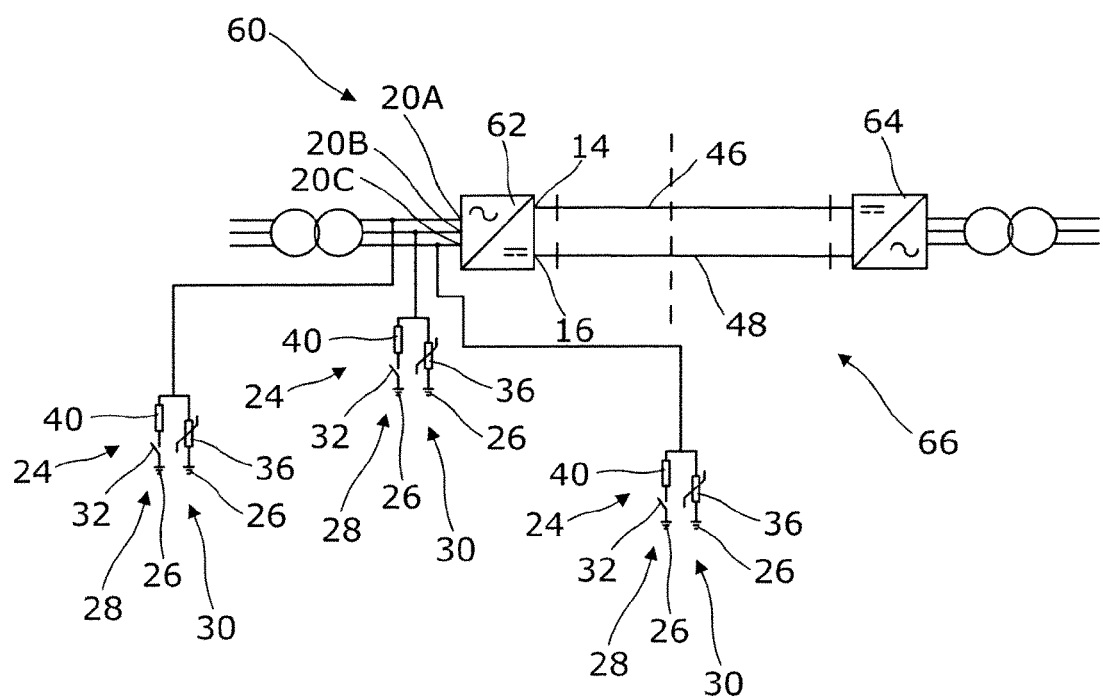

FIG. 2(c) illustrates schematically operation of the electrical assembly shown in FIG. 1 in a further mode; and FIG. 3 shows a schematic view of a power transmission network including an electrical assembly according to a further embodiment of the invention; and FIG. 4 shows a schematic view of a power transmission network including an electrical assembly according to a still further embodiment of the invention.

An electrical assembly according to a first embodiment of the invention is designated generally by reference numeral 10.

The electrical assembly 10 includes a power converter 12 which has first and second DC terminals 14, 16 that in use are connected to a DC network 18, and which has an AC terminal 20 that in use is connected to an AC network 22.

The power converter 12 may be a voltage source converter which includes a converter limb (not shown) that extends between the first and second DC terminals 14, 16, and includes a first limb portion that extends between the first DC terminal 14 and the AC terminal 20, and a second limb portion which extends between the second DC terminal 16 and the AC terminal 20.

Each such limb portion may include a plurality of series-connected modules that can selectively provide a voltage source which can be used to increase or decrease a voltage at the AC terminal 20 and thereby transfer power between the DC and AC networks 18, 20.

Other such power converters are, however, also possible.

The electrical assembly 10 of the invention also includes a grounding circuit 24 which in use interconnects the AC terminal 20 with ground 26, i.e. a return current path provided by the Earth. A reactor in the form of an inductor 25 is connected in series between the grounding circuit 24 and the AC terminal 20.

The grounding circuit 24 defines first and second current flow paths 28, 30 between the AC terminal 20 and the ground 26.

The first current flow path 28 includes a switching element 32 which is operable to selectively open and close the first current flow path 28.

The switching element 32 may be a disconnector, e.g. of the type used to ensure that an electrical circuit is completely de-energised for service or maintenance. The contacts of such a disconnector can be subjected to a high making current as they approach closure, and so such contacts must be suitable for closing onto a load current.

The switching element 32 may also be an AC circuit breaker of the type which typically closes in approximately 40 to 200 ms. Such a circuit breaker is, therefore, well-suited for use as a fast acting make switch.

The switching element 32 can also be a mechanical switch configured for DC switching duties.

The switching element 32 may still further be a device constructed from one or more series-connected power electronic elements, such as semiconductor devices like Insulated Gate Bipolar Transistors (IGBTs).

The second current flow path 30 includes a first current flow control element 34 which, in the embodiment shown, is configured to operate in a first mode in which it minimises, i.e. reduces to as close to zero as possible, the flow of current through the second current flow path 30 when the first current flow path 28 is open, and in a second mode in which it allows the flow of current through the second current flow path 30 when the voltage across the first current flow control element 34 exceeds a predetermined threshold.

More particularly, in the embodiment shown the first current flow control element 34 is a non-linear resistor, and more particularly still a surge arrestor 36.

In other embodiments, the first current flow control element 34 may take a different form.

In the embodiment shown, the first current flow path 28 also includes a second current flow control element 38 which is connected in series with the switching element 32. The second current flow control element 38 is configured to reduce the flow of current therethrough to a less extent that the first current flow control element 34 when configured to operate in its first mode.

The second current flow control element 38 is a linear resistor 40 which has a resistance that is less than the resistive effect provided by the surge arrestor 36 when operating in its first mode.

In addition to the foregoing the electrical assembly 10 also includes a control unit 42 which is operatively connected to each of the first and second DC terminals 14, 16 and to the switching element 32.

The control unit 42 is configured to monitor the first and second DC terminals 14, 16 to check for the occurrence of a DC network fault which manifests itself at one or both of the said DC terminals 14, 16.

The control unit 42 is also configured to operate the switching element 32 to close the first current flow path 28 (which is otherwise normally maintained open) a predetermined period of time after occurrence of a DC network fault.

In other embodiments of the invention the control unit 42 may be configured to operate the switching element 32 at a different predetermined point. For example, the control unit 42 may be configured to monitor the energy stored in the first current flow control element 34, e.g. the surge arrestor 36, and to operate the switching element 32 to close the first current flow path 28 when the energy dissipated by the surge arrestor 36 reaches a predetermined threshold.

Operation of the electrical assembly 10 in use, and more particular following the occurrence of a DC network fault, is illustrated schematically in FIGS. 2(a) to 2(c).

One type of DC network fault is a DC short circuit 44 between a first DC transmission medium, i.e. first DC transmission cable 44, and ground 26, as shown in FIG. 2(a). When such a fault arises a second DC transmission medium, i.e. a second DC transmission cable 46, is often exposed to a full converter voltage $V_{DC}$ which the power converter 12 generates between the first and second DC terminals 14, 16, such that a voltage $V_{DC/2}$ arises at the AC terminal 20. The AC terminal voltage $V_{DC/2}$ is typically half of the full converter voltage $V_{DC}$.

Under such circumstances the switching element 32 is configured to maintain open the first current flow path 28 such that the only current path between the AC terminal 20 and ground 26 is provided for by the second current flow path 30 in which the surge arrestor 36 is operating in its first mode to minimise the flow of current through the second current flow path 30. The current flow restriction characteristics of the surge arrestor 36 are chosen in light of the operating conditions of an associated network, such that the current able to flow through the second current flow path 30 typically is less than 1A, i.e. as close to zero as practicable and essentially negligible within the ordinary operating parameters of the power converter 12.

As such the surge arrestor 36 essentially prevents the discharge of the AC terminal voltage $V_{DC/2}$ to ground 26 and so allows the power converter 12 to continue transferring power between the DC and AC networks 18, 20 throughout the DC network fault 44.

In this manner the surge arrestor 36 also essentially inhibits the flow of a DC circulating current within the faulty DC network 18 such that, if desired, e.g. a DC circuit breaker, a DC load break switch, or an AC circuit breaker may be opened without being exposed to a damaging fault current, so as to disconnect the DC network 18 from the AC network 20.

If a transient overvoltage arises at the AC terminal 20, i.e. the voltage at the AC terminal exceeds a predetermined threshold equal to the "trigger" or "clamping" voltage of the surge arrestor 36, the surge arrestor 36 will thereafter operate in its second mode. The predetermined threshold is chosen according to the voltage protection rating of the insulation of a starpoint terminal associated with the AC terminal 20, and such that the voltage at the AC terminal does not exceed a safe limit beyond which the AC side of the power converter 12 might be damaged.

When operating in its second mode the surge arrestor 36 allows current to flow through the second current flow path 30, as shown in FIG. 2(b), and so provides a first path 50 to ground 26 whereby the overvoltage is able safely to discharge. Such operation of the surge arrestor 36 therefore provides for automatic protection of the AC side of the power converter 12.

Providing a transient overvoltage does not arise at the AC terminal 20, the surge arrestor 36 continues to provide the aforementioned limiting of current flow through the second current flow path 30.

In such circumstances the control unit 42, having already identified the occurrence of a DC network fault, i.e. the DC short circuit 44, operates the switching element 32 to close the first current flow path 28 and thereby provide a second path 52 to ground 26, as shown in FIG. 2(c).

The control unit 42 is configured to operate the switching element 32 in this manner a predetermined period of time after occurrence of the DC short circuit 44. One way in which such a period of time may be determined is with reference to the period of time that any fault clearing apparatus (not shown) in the DC network 18 might normally take to clear such a fault.

More particularly, the delay between a DC network fault arising and the control unit 42 operating the switching element 32 to close the first current flow path 28 is chosen so that ordinarily the fault clearing apparatus will have cleared the fault.

With no DC network fault remaining the first and second DC terminals 14, 16 are able to return to their normal operating voltages. There may, however, be an imbalance between the voltage at each of the DC terminals 14, 16, e.g. the magnitude of each voltage may differ, such that a small voltage remains at the AC terminal 20.

Closing of the switching element 32 and the resulting provision of a second path 52 to ground 26, discharges any remaining AC terminal voltage, and so acts to remove any voltage imbalance between the first and second DC terminals 14, 16.

The second current flow control element 38, i.e. the linear resistor 40, acts to control the rate at which any such discharge takes place, and hence the rate at which the voltage imbalance is removed.

If a DC network fault remains, e.g. in circumstances where the fault clearing apparatus in the DC network 18 has failed, then closing the switching element 32 and the resulting provision of a second path 52 to ground 26 discharges the still remaining AC terminal voltage $V_{DC/2}$, via the linear resistor 40, in a controlled manner and so provides a degree of back-up protection to the AC side of the power converter 12.

An electrical assembly 60 according to a second embodiment of the invention is shown schematically in FIG. 3.

The second electrical assembly 60 is similar to the first electrical assembly 10 and like features share the same reference numerals.

The second electrical assembly 60 differs, however, from the first electrical assembly 10 in that it includes a second power converter 62, in the form of a voltage source converter, that includes three converter limbs, each of which is associated with a given phase of a three-phase AC network 20.

Each phase has a given AC terminal 20A, 20B, 20C associated therewith, each of which is connected in series with a grounding circuit 24 by a respective inductor 25.

The second power converter 62 is connected with a further power converter 64 via first and second DC transmission cables 46, 48 to define a power transmission network 66.

In use the second electrical assembly 60 operates in a very similar manner to the first electrical assembly 10, with the grounding circuit 24 functioning in relation to each of the AC terminals 20A, 20B, 20C in essentially the same manner as described hereinabove in relation to the single AC terminal 20 of the power converter 12 in the first electrical assembly.

In other embodiments, it is envisaged that the second electrical assembly 60 may include a plurality of grounding circuits 24 and may omit the inductors 25 so that each of the plurality of grounding circuits 24 is connected independently and directly with a respective one of the AC terminals 20A, 20B, 20C, as shown in FIG. 4.

The invention claimed is:

1. An electrical assembly comprising:
   a power converter comprising first and second DC terminals connectable to a DC network and an AC terminal connectable to an AC network; and a grounding circuit to connect the AC terminal to ground, the grounding circuit defining first and second current flow paths between the AC terminal and ground, the first current flow path comprising a switching element operable to selectively open and close the first current flow path, and the second current flow path comprising a first current flow control element configured to operate in a first mode in which it minimizes the flow of current through the second current flow path when the first current flow path is open and thereby minimizes the flow of current between the AC terminal and ground when the first current flow path is open; and a control unit operatively connected to the switching element, the control unit being configured to operate the switching element to maintain open the first current flow path for a predetermined period of time following an occurrence of a DC network fault such that the second current flow path is the only current flow path between the AC terminal and ground when the first current flow path is open, the predetermined period of time based on an amount of time that a fault clearing apparatus takes to clear the DC network fault, the control unit further configured to operate the switching element to close the first current flow path at a predetermined point, the predetermined point being after the predetermined period of time;

wherein the power converter is configured to continue transferring power between the DC and AC networks throughout the DC network fault.

2. An electrical assembly according to claim 1 wherein the first current flow control element is further configured to selectively operate in a second mode in which it allows the flow of current through the second current flow path when the voltage across the first current flow control element exceeds a predetermined threshold.

3. An electrical assembly according to claim 2 wherein the first current flow control element comprises a non-linear resistor.

4. An electrical assembly according to claim 1 wherein the first current flow path additionally comprises a second current flow control element configured to reduce the flow of current therethrough to a lesser extent than the first current flow control element when configured to operate in its first mode.

5. An electrical assembly according to claim 4 wherein the second current flow control element comprises a linear resistor.

6. An electrical assembly according to claim 1 wherein the control unit is operatively connected with the first and second DC terminals to monitor the occurrence of a DC network fault associated with one or both of the DC terminals, the control unit additionally being configured to operate the switching element to close the first current flow path at a predetermined point.

7. An electrical assembly according to claim 6 wherein the predetermined point at which the control unit is configured to operate the switching element to close the first current flow path is a set period of time after occurrence of a DC network fault.

8. An electrical assembly according to claim 6 wherein the predetermined point at which the control unit is configured to operate the switching element to close the first current flow path is when the energy dissipated by the first current flow control element reaches a threshold value.

9. An electrical assembly comprising:

a power converter comprising first and second DC terminals connectable to a DC network and an AC terminal connectable to an AC network; and a grounding circuit to connect the AC terminal to ground, the grounding circuit defining first and second current flow paths between the AC terminal and ground, the first current flow path comprising a switching element operable to selectively open and close the first current flow path, and the second current flow path comprising a first current flow control element configured to operate in a first mode in which it reduces the flow of current through the second current flow path when the first current flow path is open and thereby reduces the flow of current between the AC terminal and ground when the first current flow path is open; and a control unit operatively connected to the switching element, the control unit being configured to operate the switching element to maintain open the first current flow path for a predetermined period of time following an occurrence of a DC network fault, such that the second current flow path is the only current flow path between the AC terminal and ground when the first current flow path is open, the predetermined period of time based on an amount of time that a fault clearing apparatus takes to clear the DC network fault, the control unit further configured to operate the switching element to close the first current flow path at a predetermined point, the predetermined point being after the predetermined period of time;

wherein the power converter is configured to continue transferring power between the DC and AC networks during the DC network fault.

10. An electrical assembly according to claim 9 wherein the first current flow control element is further configured to selectively operate in a second mode in which it allows the flow of current through the second current flow path when the voltage across the first current flow control element exceeds a threshold.

11. An electrical assembly according to claim 9 wherein the control unit is operatively connected with the first and second DC terminals to monitor the occurrence of a DC network fault associated with one or both of the DC terminals, the control unit additionally being configured to operate the switching element to close the first current flow path at a predetermined point.

* * * * *